(No Model.)
J. W. STOCKWELL.
MANUFACTURE OF ARTICLES FROM HYDRAULIC CEMENT.
No. 384,295. Patented June 12, 1888.
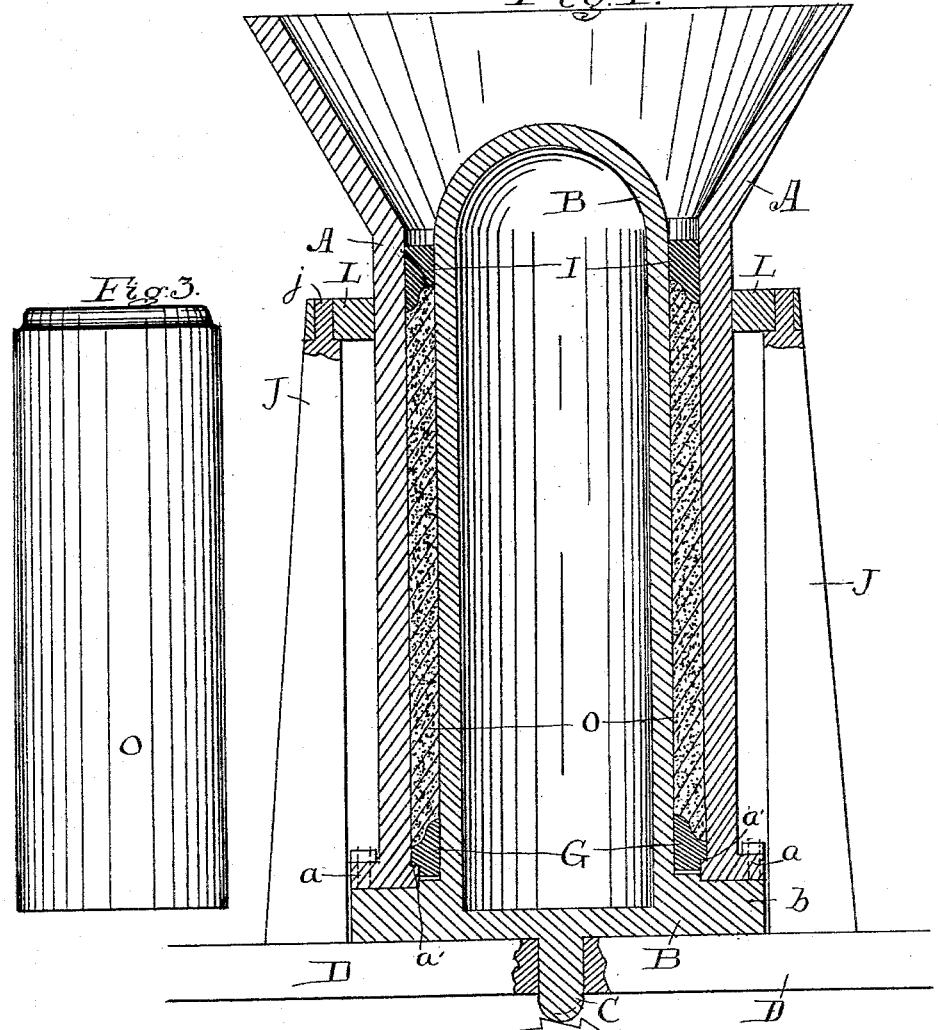
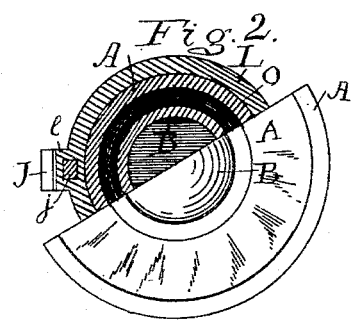
Witnesses:
Robert A. Davis
A. M. Sampson
Inventor:
John W. Stockwell.
by S. W. Bates.
his Atty.

UNITED STATES PATENT OFFICE.

JOHN W. STOCKWELL, OF PORTLAND, MAINE.

MANUFACTURE OF ARTICLES FROM HYDRAULIC CEMENT.

SPECIFICATION forming part of Letters Patent No. 384,295, dated June 12, 1888.

Application filed March 15, 1887. Serial No. 230,934. (No model.)

*To all whom it may concern:*

Be it known that I, JOHN W. STOCKWELL, a citizen of the United States, residing at Portland, in the county of Cumberland and State of Maine, have invented certain new and useful Improvements in the Art of Manufacturing Articles from Hydraulic Cement; and I do hereby declare the following to be a full, clear, and exact description of the invention, such as will enable others skilled in the art to which it appertains to make and use the same.

My invention relates to the manufacture of drain-pipe and other articles from hydraulic cement, and to the treatment or manipulation of such cement when it is to be used in bulk or in masses as distinguished from its use as mortar. Hitherto it has been customary in using cement in the manufacture of artificial stoneware, concrete, and for other purposes, to first incorporate a specific quantity of sand, gravel, broken stone, or whatever was to be used with the cement, and then to add water enough to form the material into a pasty mass of more or less consistency, according to the use to which it was to be put. The water was added gradually or all at one time, but it was thoroughly mixed with the cement, and the pasty mass was then rammed or compacted in the molds or into the position where it was to remain, and was then allowed to harden or "set." When treated in this manner, I have found that the material after hardening or "setting" fully contained a very considerable proportion of air spaces or cells within the body of the article, varying greatly, of course, according to the relative proportions of the coarse and fine materials. Again, in the manufacture of drain-pipe, I have been obliged to use molds which opened laterally, since the mechanical stirrer which I have used in compacting the moistened material into the molds has caused the abrasion or roughening of the surface of the molds, so that the pipe could not be withdrawn without opening them laterally, thereby forming two or more longitudinal joints or seams in the pipe, which detracted from its appearance and rendered the surface less smooth. I have found that if cement and sand, or cement and other material adapted to be used as a matrix, be thoroughly mixed together in a dry state and then, after being placed in the mold or in the position where they are to be finally used, are jarred or shaken for a considerable time, so that they are thoroughly settled together, and are then allowed to absorb as much water as they will take up, the resulting product, when it is allowed to harden, possesses great compactness and tensile strength as compared with cement articles made by the old process.

My invention therefore consists of the method of manufacturing articles from hydraulic cement or other analogous material which comprises the mixing of the matrix material with the cement in a dry state, compacting it in molds or in the place where it is to be allowed to harden by jarring or otherwise and then allowing it to absorb enough water to moisten the mass.

My invention further consists of certain special machinery by which this process is adapted to the manufacture of cement pipe and other cylindrical forms.

In the accompanying drawings, I illustrate a device for carrying my process into effect in the manufacture of drain-pipe.

In the drawings, Figure 1 represents a central vertical section of a pipe-mold, showing vibrating device underneath. Fig. 2 is a half top view on a smaller scale and half section on $x\ x$ of Fig. 1. Fig. 3 is a view of the finished pipe.

B is a central core having the diameter of the inside of the pipe. Its upper end is convex or dome shape, and on its lower end is an outward-projecting flange, $b$.

A is the outer shell of the mold, being bolted to the flange $b$ by the flange $a$. On the inside near the bottom is a small ledge, $a'$. The upper part of the shell A is flaring or hopper-shaped. A ring, G, rests on the ledge $a'$, filling the space between the shell and the core, its upper edge conforming to the end of the pipe.

O represents the pipe after being formed, and I is a heavy ring whose under side conforms to the shape of the end of the pipe. This ring I is removable.

D is a base or table on which the mold rests, and extending downward through it is the tongue C, having a rounded or convex end. A toothed cam, P, running on an arbor, R, is adapted to rotate under the tongue C in such a manner that as it revolves the tongue C and the whole mold will be slightly raised as each tooth of the cam passes beneath the tongue. A ring, L, surrounds the upper part of the shell A and is supported by standards J J.

My process is carried out by the use of this mechanism as follows, viz: The ring I being removed, cement and sand thoroughly mixed together in a dry state are introduced into the top of the mold. The cam P is then rotated, thus giving to the mold a vertical vibrating motion which has the result of jarring the materials into the annular space surrounding the core. Before the sand and cement have settled to the lowest point the ring I is introduced in the top of the mold. As the sand and cement settle, the ring I follows down and forms the upper edge of the pipe. When the cement and sand have practically ceased to settle, the mold is placed in water and the cement is allowed to absorb water until the mass is completely moistened. The lower end of the mold can be placed in water, and water at the same time poured into the hopper of the mold, so that the process of absorption shall go in two directions, or any other suitable means of moistening the mass may be resorted to. The material being moistened is removed from the mold by first withdrawing the core and then slipping out the formed pipe. As thus formed the surface of the pipe will be found smooth and even, containing no seams, as when laterally-opening molds are used, and its structure will be compact and firm and of great tensile strength. It will also be free from all air holes or cells, all the material being compacted together in one homogeneous mass. The increase in tensile strength of cement articles or stoneware made by my process over the old way I estimate from twenty-five per cent. upward.

It is obvious that this process is applicable to the manufacture of artificial stone and stoneware of all kinds from cement or from any like material—such as asbestos—where the materials are to be brought into intimate contact and are chemically changed and hardened by contact with water. The increased density and hardness is probably due to the close contact into which the materials are brought and the fact that all the interstices are filled with the finer material by the jarring, and also to the fact that the chemical action of the water on the cement is not interrupted after having once begun, as in the ordinary process. Such interruption, as is well known, always weakens the cement product.

My process, beside being adapted to the making of articles of cement, is applicable to the laying of concrete and to other cases where the cement is used in bulk. The material is to be mixed dry and rammed or otherwise compacted in place and then allowed to absorb its water after being placed in position.

My invention is also well adapted to forming a surface on macadamized or other roads. When used for this purpose, the cement and sand or broken stone are mixed together in a dry state and then deposited in a layer on the surface of the road, afterward being rolled or otherwise compacted. It is then sprinkled or allowed to absorb water from the atmosphere until it becomes very hard, furnishing a superior surface.

It is apparent that by my process large bulks of cement can be used or laid down in one operation, while by the old method only comparatively small bulks could be used on account of the rapidity with which it set after being mixed with water. My method thus renders cement applicable to many uses to which it could not before be put.

I claim—

1. The herein-described improvement in the art of manufacturing artificial stone from hydraulic cement and sand or other like material, which consists of first mixing the materials together when in a dry state, then compacting them into suitable molds, and then allowing them to absorb sufficient water to moisten the mass and to effect the chemical combination, substantially as described.

2. The herein described improvement in the art of manufacturing artificial stone, which consists in mixing together hydraulic cement and sand or other matrix material when in a dry state, then introducing such mixture into a suitable mold, shaking or vibrating the said mold to settle and compact the material, and finally allowing it to absorb sufficient water to moisten the mass, substantially as described.

3. The herein-described improvement in the art of manufacturing artificial stone from hydraulic cement, which consists in first mixing the cement with suitable matrix material, then compacting it in the position where it is to be used, and finally allowing it to absorb sufficient water to effect the chemical combination, substantially as described.

In testimony whereof I affix my signature in presence of two witnesses.

JOHN W. STOCKWELL.

Witnesses:
S. W. BATES,
ROBERT A. DAVIS.